(12) United States Patent
Mazurek et al.

(10) Patent No.: US 7,998,587 B2
(45) Date of Patent: Aug. 16, 2011

(54) METHOD OF MODIFYING LIGHT WITH SILICONE (METH)ACRYLATE COPOLYMERS

(75) Inventors: Mieczyslaw H. Mazurek, Roseville, MN (US); Robert L. Brott, Woodbury, MN (US); David J. Kinning, Woodbury, MN (US); Yufeng Liu, Woodbury, MN (US); John E. Potts, Woodbury, MN (US); Kevin R. Schaffer, Woodbury, MN (US); Audrey A. Sherman, St. Paul, MN (US); Wendi J. Winkler, Minneapolis, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 578 days.

(21) Appl. No.: 11/930,549

(22) Filed: Oct. 31, 2007

(65) Prior Publication Data

US 2009/0262348 A1 Oct. 22, 2009

(51) Int. Cl.
*B32B 1/00* (2006.01)
*B32B 9/04* (2006.01)
*G02B 6/00* (2006.01)
*G02B 5/30* (2006.01)

(52) U.S. Cl. ........ 428/447; 428/448; 428/141; 428/156; 385/122; 385/115; 385/123; 359/599

(58) Field of Classification Search .......... 356/364–369, 356/432–439; 359/63, 73, 321, 485, 599; 385/122, 123, 115, 131, 127; 428/141, 156, 428/447, 448
See application file for complete search history.

(56) References Cited

U.S. PATENT DOCUMENTS

| | | | |
|---|---|---|---|
| 5,126,866 A * | 6/1992 | Yoshimizu et al. ........... 349/119 |
| 6,256,146 B1 | 7/2001 | Merrill et al. | |
| 6,297,906 B1 | 10/2001 | Allen et al. | |
| 6,590,705 B1 | 7/2003 | Allen et al. | |
| 6,590,707 B1 | 7/2003 | Weber | |
| 6,727,313 B2 | 4/2004 | Zhou et al. | |
| 6,967,071 B2 * | 11/2005 | Dickerson et al. ............ 430/139 |
| 6,986,855 B1 | 1/2006 | Hood et al. | |
| 7,356,231 B2 * | 4/2008 | Ouderkirk et al. ............ 385/123 |
| 7,406,239 B2 * | 7/2008 | Ouderkirk et al. ............ 385/131 |
| 7,599,592 B2 * | 10/2009 | Benson et al. ................ 385/122 |
| 2004/0234724 A1 * | 11/2004 | Kaminsky et al. ............ 428/141 |
| 2006/0226562 A1 * | 10/2006 | Johnson et al. .............. 264/1.34 |
| 2007/0054133 A1 | 3/2007 | Sherman et al. | |
| 2007/0055019 A1 | 3/2007 | Sherman et al. | |
| 2008/0024872 A1 | 1/2008 | Dunn et al. | |

OTHER PUBLICATIONS

Mazurek, et al., Journal of Applied Polymer Science, "Novel Materials Based on Silicone-Acrylate Copolymer Networks", vol. 80, pp. 159-180, (2001).

Sherman et al, "Methods for Changing the Shape of a Surface of a Shape Memory Polymer Article", U.S. Appl. No. 11/460,682, filed Jul. 28, 2006.

Mazurek, et al., "Shape Memory Polymer Articles With a Microstructured Surface", U.S. Appl. No. 11/460,685, filed Jul. 28, 2006.

Mazurek, et al., "Method of Forming an Image Having Multiple Phases", U.S. Appl. No. 11/930,800, filed Oct. 31, 2007.

* cited by examiner

*Primary Examiner* — Sang Nguyen
(74) *Attorney, Agent, or Firm* — Elizabeth A. Gallo

(57) ABSTRACT

A method of modifying light is disclosed and includes: providing an optical element having an oriented polymer network of a silicone (meth)acrylate copolymer and exhibiting a first phase and a second phase, the first phase and the second phase being chemically connected and having different refractive indices, the first phase being continuous, and the second phase comprising a plurality of structures dispersed within the first phase; illuminating the optical element with light from a light source; and detecting polarized or directionally diffused light transmitted by the optical element. Optical elements including the polymer network and a variety of additional layers are also disclosed, as are optical devices such as prisms, display panels, lenses, and the like.

10 Claims, 1 Drawing Sheet

0.25 μm 0.25 μm 0.25 μm 0.25 μm

METHOD OF MODIFYING LIGHT WITH SILICONE (METH)ACRYLATE COPOLYMERS

CROSS-REFERENCE TO RELATED APPLICATION

This application is related to commonly assigned, co-pending U.S. patent application Ser. No. 11/930,800 by Mazurek et al., entitled "Method of Forming an Image Having Multiple Phases", and filed of even date herewith.

BACKGROUND

This disclosure relates to a method of modifying light with optical elements having silicone acrylate polymer networks.

Optical elements such as polarizers and diffusers are used in a wide variety of optical devices. Examples include display devices in which an optical element is used to enhance brightness and reduce glare, and in sunglasses to reduce light intensity and glare. Accordingly, there is a need in the art for optical elements made from a variety of materials and constructions and that can be used in the design and manufacture of optical devices for a variety of applications.

BRIEF SUMMARY

In one aspect, a method of modifying light is disclosed herein. The method comprises: providing an optical element comprising an oriented polymer network, the oriented polymer network comprising a silicone (meth)acrylate copolymer and exhibiting a first phase and a second phase, the first phase and the second phase being chemically connected and having different refractive indices, the first phase being continuous, and the second phase comprising a plurality of structures dispersed within the first phase; illuminating the optical element with light from a light source; and detecting polarized or directionally diffused light transmitted by the optical element. In one embodiment, the silicon (meth)acrylate copolymer comprises a telechelic siloxane such as bis(3-aminopropyl)polydimethylsiloxane or one represented by the formula:

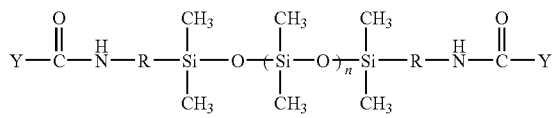

wherein
R is a divalent hydrocarbon group;
n is an integer from about 15 to about 1000; and
Y is selected from the group consisting of:

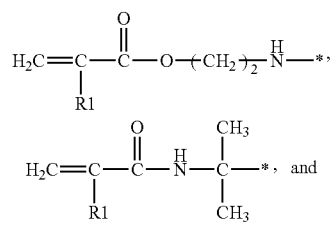

In one embodiment, the silicon (meth)acrylate copolymer comprises a telechelic siloxane represented by the formula:

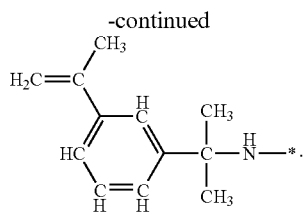

wherein $R^2$ is independently an alkyl, haloalkyl, aralkyl, alkenyl, aryl, or aryl substituted with an alkyl, alkoxy, or halo; G is independently an alkylene, aralkylene, or a combination thereof, and x is equal to an integer of from about 15 to about 1000.

In one embodiment, the silicone (meth)acrylate comprises one or more (meth)acrylate monomers selected from the group consisting of iso-bornyl acrylate, iso-bornyl methacrylate, tert-butyl acrylate, iso-octyl acrylate, cyclohexyl acrylate, cyclohexyl methacrylate, trimethyl cyclohexyl acrylate, methyl methacrylate, methacrylic acid, benzyl methacrylate, ethyl methacrylate, 1-methylcyclohexyl methacrylate, 2-methylcyclohexyl methacrylate, 3-methylcyclohexyl methacrylate, 4-methylcyclohexyl methacrylate, 2-phenoxy ethyl methacrylate, 2-ethylhexyl acrylate, and hexanediol dimethacrylate. In one embodiment, the oriented polymer network comprises liquid crystals, nanoparticles, or a mixture thereof.

In another aspect, a method of modulating light is disclosed herein, comprising providing an optical element comprising an oriented polymer network, the oriented polymer network comprising a silicone (meth)acrylate copolymer and exhibiting a first phase and a second phase, the first phase and the second phase being chemically connected and having different refractive indices, the first phase being continuous, and the second phase comprising a plurality of structures dispersed within the first phase; illuminating the optical element with light from a light source; and heating the optical element, whereby the amount of light transmitted through the optical element is increased.

In another aspect, an optical element is disclosed herein. The optical element comprises an oriented polymer network comprising a silicone (meth)acrylate copolymer and exhibiting a first phase and a second phase, the first phase and the second phase being chemically connected and having different refractive indices, the first phase being continuous, and the second phase comprising a plurality of structures dispersed within the first phase; and an additional layer adjacent the oriented polymer network. In one embodiment, the additional layer may comprise an isotropic optical layer such as an antireflective layer, a hardcoat layer, a diffusive layer, or a color filter layer. In another embodiment, the additional layer may comprise a multilayer optical film or an oriented polymer layer. In yet another embodiment, the additional layer may comprise a non-optical layer such as an adhesive layer, an antistatic layer, or a release layer. The optical element may also have an outer surface comprising a plurality of features such as lenticular or prismatic features and/or features having random sizes and shapes.

In another aspect, methods of making optical elements are disclosed herein. The methods may comprise coating a polymerizable composition on a substrate, the polymerizable composition comprising first and second monomers, and the substrate comprising a multilayer optical film, an antireflective layer, a hardcoat layer, a diffusive layer, a color filter layer, an adhesive layer, an antistatic layer, or a release layer; and polymerizing the first and second monomers, thereby forming the above-described polymer network. The substrate may comprise a polymer layer, and after the first and second monomers are polymerized to form the polymer network, the polymer layer and the polymer network are oriented. In one embodiment, the polymer network may be oriented and laminated to another layer.

In another aspect, an optical device is disclosed herein. The optical device comprises the above-described polymer network that is oriented, and the optical device comprises a prism, a display panel, a lens, a wire grid polarizer, a diffuser plate, a backlight assembly, or a light guide.

These and other aspects of the invention are described in the detailed description below. In no event should the above summary be construed as a limitation on the claimed subject matter which is defined solely by the claims as set forth herein.

BRIEF DESCRIPTION OF THE DRAWINGS

The invention may be more completely understood in consideration of the following detailed description in connection with the following figures.

DETAILED DESCRIPTION

Figure 1A:
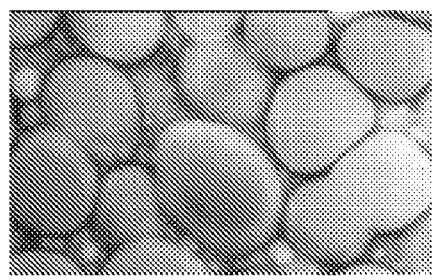
FIG. 1a shows a micrograph of a polymer network before stretching.

The method disclosed herein provides numerous advantages, particularly when used in conjunction with optical applications in which light is intentionally modified, modulated, managed, enhanced, manipulated, controlled, maintained, transmitted, reflected, refracted, absorbed, etc. In particular, the method is advantageous in that it provides a way to modify light, particularly by polarizing or directionally diffusing the light. The method is also advantageous in that it provides a way to modulate transmission of light through an element.

The methods described above utilize an optical element comprising an oriented polymer network of a silicone (meth) acrylate copolymer. Silicone (meth)acrylate copolymers can be made by copolymerization of a family of telechelic free radically polymerizable siloxanes with various (meth)acrylate monomer, and a wide variety of such copolymers can be made with the appropriate choice of materials, their respective amounts, polymerization conditions, etc. Accordingly, the way in which light is modified and/or manipulated can be tailored depending on the particular application.

The method disclosed herein provides a way of modifying light, particularly polarization and directional diffusion of light. The method comprises: providing an optical element comprising an oriented polymer network, the oriented polymer network comprising a silicone (meth)acrylate copolymer and exhibiting a first phase and a second phase, the first phase and the second phase being chemically connected and having different refractive indices, the first phase being continuous, and the second phase comprising a plurality of structures dispersed within the first phase; illuminating the optical element with light from a light source; and detecting polarized or directionally diffused light transmitted by the optical element.

The polymer network formed by polymerization of the monomers comprises different phases, for example, the first and second phases described above. For a polymer network formed from a telechelic siloxane and (meth)acrylate monomer, the relatively non-polar siloxane may form one phase, and the polyacrylate may form the other phase. In general, the first and second phases have different refractive indices, i.e., refractive indices that differ by at least about 0.01. The difference between refractive indices of the first and second phases can be varied depending on the desired application in which the optical element is used. For example, in some cases, it may be desirable for the refractive indices of the phases in the polymer network to differ by at least about 0.05 and up to about 0.2. Typical refractive indices for polyorganosiloxane materials can be from about 1.40 to about 1.77, and for (meth)acrylate monomers can range between about 1.34 and 1.63.

In some other cases, it may be desirable for the refractive indices of the phases in the polymer network to be substantially equal to each other before being stretched. The refractive index difference is desirably less than about 0.05 and down to 0.001. The substantial match of refractive indices gives rise to a substantially clear/transparent film before stretching desirable in applications where high transmittance is required at zero strain.

In yet some other cases, it may be desirable for the network domains for one of the phases to be small enough such that the domain size is below about ⅙ of visible light. The finely dispersed network domain will not scatter visible light. As shown in at least one example, the resulting film is substantially clear/transparent before stretching.

Polarization and directional diffusion capacities of the polymer network are determined by how and to what extent a particular network is oriented. Typically, orientation of the polymer network, as described below, produces refractive index matches or mismatches along one or more axes. The magnitude of the refractive index mismatch along a particular axis directly affects the degree of scattering of light polarized along that axis. In general, scattering power increases as the refractive index mismatch increases. Thus, the larger the index mismatch along a particular axis, the stronger the scattering of light polarized along that axis. Conversely, when the mismatch along a particular axis is small, light polarized along that axis is scattered to a lesser extent and is thereby substantially transmitted specularly through the oriented polymer network. Optical properties described herein can be detected using known methods and instruments such as polarimeters and conoscopes.

If the index of refraction of the structures (the second phase) matches that of the other phase along some axis, then incident light polarized with electric fields parallel to this axis will be substantially specularly transmitted (unscattered) through the optical body, regardless of the size, shape, and density of structures. If the indices are not matched along some axis, then the structures will scatter light polarized along this axis. For scatterers of a given cross-sectional area with dimensions larger than approximately $\lambda/30$ (where $\lambda$ is the wavelength of light in the media), the strength of the scattering is largely determined by the index mismatch. The exact size, shape and alignment of a mismatched structure play a role in determining how much light will be scattered into various directions from that structure. If the density and thickness of the scattering layer is sufficient, according to multiple scattering theory, the transmission of the incident light can be made arbitrarily small, regardless of the details of the scattered size and shape. As a result, the incident light is then either reflected or absorbed.

When the material is to be used as a polarizer, it is preferably processed, as by stretching and allowing some dimensional relaxation in the cross stretch in-plane direction, so that the index of refraction difference between the first and second phases is large along a first axis in a plane parallel to a surface of the material and small along the other two orthogonal axes. This results in a large optical anisotropy for electromagnetic radiation of different polarizations.

The optical element can be an elliptical polarizer. In general, an elliptical polarizer will have a difference in index of refraction between the first and second phases for both the stretch and cross-stretch directions. The ratio of forward to back scattering is dependent on the difference in refractive index between the phases, the concentration of the disperse phase, the size and shape of the disperse phase, and the overall thickness of the body. In general, elliptical diffusers have a relatively small difference in index of refraction between the particles of the phases. By using a birefringent polymer-based diffuser, highly elliptical polarization sensitivity (i.e., diffuse reflectivity depending on the polarization of light) can be achieved. At an extreme, where the index of refraction of the polymers match on one axis, the elliptical polarizer will be a diffuse reflecting polarizer.

The materials selected for use in an optical body designed to function as a reflective polarizer in accordance with the present invention, and the degree of orientation of these materials, are preferably chosen so that the phases in the finished optical body have at least one axis for which the associated indices of refraction are substantially equal. The match of refractive indices associated with that axis results in substantially no reflection of light in that plane of polarization.

The second phase may also exhibit a change in the refractive index associated with the direction of orientation after stretching. It is preferred that the second phase exhibit a decrease in the refractive index after stretching. If the birefringence of the host is positive, a negative strain induced birefringence of the second phase has the advantage of increasing the difference between indices of refraction of the adjoining phases associated with the orientation axis while the reflection of light with its plane of polarization perpendicular to the orientation direction is still negligible. For an optically polarizing body, differences between the indices of refraction of adjoining phases in the direction orthogonal to the orientation direction should be less than about 0.05 after orientation, and preferably, less than about 0.02, and more preferably, less than about 0.01.

The second phase may also exhibit a positive strain induced birefringence. However, this can be altered by means of heat treatment to match the refractive index of the axis perpendicular to the orientation direction of the first phase. The temperature of the heat treatment should not be so high as to relax the birefringence in the first phase.

It should be understood that the first phase may exhibit a negative strain induced birefringence. For this case, it is preferred that the second phase exhibit an increase in the refractive index after stretching.

By careful manipulation of orientation parameters and other processing conditions, the positive and negative birefringences of the polymer network can be used to induce reflection or transmission of one or both polarizations of light along a given axis. The relative ratio between transmission and diffuse reflection is dependent on the concentration of the phase that is dispersed, the thickness of the polymer network, and the square of the difference in the index of refraction between the two phases, the size and geometry of the phase that is dispersed, and the wavelength or wavelength band of the incident radiation.

In general, for the oriented polymer network, the first and second phases have different refractive indices along at least one axis, with the difference being at least about 0.01. The difference between refractive indices of the first and second phases can be varied depending on the desired application in which the optical element is used. For example, in some cases, it may be desirable for the refractive indices of the phases in the oriented polymer network to differ by at least about 0.05 and up to about 0.2. Typical refractive indices for polyorganosiloxane materials can be from about 1.40 to about 1.77, and for (meth)acrylate monomers can range between about 1.34 and 1.63.

When used as a polarizer, the optical element may be designed to at least partially reflect light so that it can function as a reflector, i.e., a reflective polarizer. In this way, the method allows one to achieve reflection or transmission of light as a function of wavelength, polarization state, and direction of incidence. For another example, the optical element may be used as a diffuser for diffusing light in an isotropic or directional manner.

The light modulation can also be coupled with other structural rearrangements such as cavitations. In at least one example, an essentially clear film becomes opaque upon stretching in at least one in plane direction. The resulting film changes the light transmission to a very small amount due to substantial internal light scattering at the stretched state. The process is reversible in that upon release of the strain, the film goes back to essentially clear/transparent appearance.

Also disclosed herein is a method of modulating light, comprising: providing an optical element comprising an oriented polymer network, the oriented polymer network comprising a silicone (meth)acrylate copolymer and exhibiting a first phase and a second phase, the first phase and the second phase being chemically connected and having different refractive indices, the first phase being continuous, and the second phase comprising a plurality of structures dispersed within the first phase; illuminating the optical element with light from a light source; and heating the optical element, whereby the amount of light transmitted through the optical element is increased.

This method of modulating light is characteristic of the oriented polymer network as follows. The polymer network itself is believed to include an elastomeric phase or component and a "glassy" or high Tg phase or component. The glassy phase holds or constrains the elastomeric phase when the network is deformed, oriented, stretched, etc. In some cases, upon orientation, microcavities can be incorporated into the polymer network if the orientation is carried out below the Tg of the glassy phase (presumably an acrylate portion of the network). These microcavities can scatter light. Then, when the oriented polymer network is heated to at least the Tg of the glassy phase, the glassy phase flows within the microcavities, modulating the amount of light that is scattered.

In one embodiment, the polymer network comprises a silicone (meth)acrylate copolymer. One type of silicone (meth)

acrylate copolymer is derived from a telechelic siloxane which is a siloxane having more than one free radically polymerizable end group. This chemistry is described in M. Mazurek; D. J. Kinning; T. Konoshita *J. Appl. Polym. Sci.* 2001, 80(2), 159; and U.S. Ser. Nos. 11/222,284 (Sherman et al.); 11/222,450 (Sherman et al.); 11/460,685 (Mazurek et al.); and 11/460,682 (Sherman et al.); the disclosures of which are incorporated herein by reference.

Useful telechelic siloxanes comprise derivatives of bisamino-terminated polyorganosiloxanes, for example, acrylamidoamido siloxane (ACMAS), methacrylamidoamido siloxane (MACMAS), (meth)acryloxyurea siloxane (MAUS), and methylstyrylurea siloxane (MeStUS), as described in Mazurek et al. In general, these telechelic siloxanes are formed by reacting siloxane diamines with capping reagents such as vinyldimethylazlactone, isopropenyl dimethyl azlactone, isocyanatoethylmethacrylate, and m-isopropenyl α,α-dimethyl benzyl isocyanate, respectively. Collectively, ACMAS, MACMAS, MAUS, and MeStS can be represented by the formula:

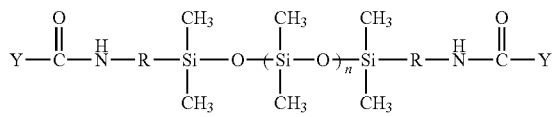

wherein

R is a divalent hydrocarbon group;

n is an integer from about 15 to about 1000; and

Y is selected from the group consisting of:

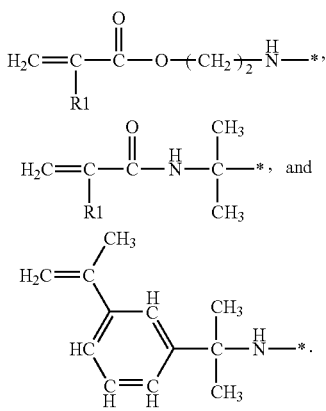

These telechelic siloxanes may have number average molecular weights in the range of from about 1,000 to about 200,000.

Other siloxane diamines are described, for example, in U.S. Pat. No. 4,890,269 (Martin), U.S. Pat. No. 4,661,577 (Jo Lane et al.), U.S. Pat. No. 5,026,890 (Webb et al.), U.S. Pat. No. 5,276,122 (Aoki et al.), U.S. Pat. No. 5,214,119 (Leir et al.), U.S. Pat. No. 5,461,134 (Leir et al.), U.S. Pat. No. 5,512,650 (Leir et al.), and U.S. Pat. No. 6,355,759 (Sherman et al.), incorporated herein by reference. Some siloxane diamines are commercially available, for example, from Shin Etsu Silicones of America, Inc., Gelest Inc., and Wacker Chemie AG.

Other siloxane diamines include those represented by the formula:

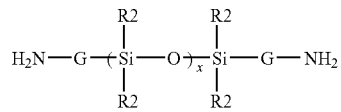

wherein $R^2$ is independently an alkyl, haloalkyl, aralkyl, alkenyl, aryl, or aryl substituted with an alkyl, alkoxy, or halo; G is independently an alkylene, aralkylene, or a combination thereof, and x is equal to an integer of from about 15 to about 1000. These siloxane diamines can be prepared as described in U.S. Pat. No. 6,355,759 B1 (Sherman et al.) and U.S. Pat. No. 6,531,620 B2 (Brader et al.). Examples of polydiorganosiloxane diamines include polydimethylsiloxane diamine, polydiphenylsiloxane diamine, polytrifluoropropylmethylsiloxane diamine, polyphenylmethylsiloxane diamine, polydiethylsiloxane diamine, polydivinylsiloxane diamine, polyvinylmethylsiloxane diamine, poly(5-hexenyl)methylsiloxane diamine, and mixtures thereof.

The telechelic siloxanes are free radically polymerized with (meth)acrylate monomers. In general, useful monomers include those which, when homopolymerized, form a homopolymer having a glass transition temperature, a melting temperature, or both greater than about 40° C. Examples include (meth)acrylate acids such as (meth)acrylic acid, and esters of non-tertiary alkyl alcohols, the alkyl groups of which comprise from about 1 to about 20, or about 1 to about 18 carbon atoms. In one embodiment, (meth)acrylate monomers include benzyl methacrylate, cyclohexyl acrylate, cyclohexyl methacrylate, ethyl methacrylate, isobornyl acrylate, isobornyl methacrylate, methyl methacrylate, 1-methylcyclohexyl methacrylate, 2-methylcyclohexyl methacrylate, 3-methylcyclohexyl methacrylate, 4-methylcyclohexyl methacrylate, 2-phenoxy ethyl methacrylate, 2-ethylhexyl acrylate, and hexanediol dimethacrylate. In another embodiment, the silicone-(meth)acrylate copolymer comprising one or more (meth)acrylate monomers selected from the group consisting of iso-bornyl acrylate, tert-butyl acrylate, iso-octyl acrylate, cyclohexyl acrylate, trimethyl cyclohexyl acrylate, methyl methacrylate, and methacrylic acid. These monomers are suitable in forming a copolymer network with a free radically polymerizable siloxane. A single (meth)acrylate monomer or a combination of (meth)acrylate monomers may be used.

The relative amounts of telechelic siloxane and (meth)acrylate monomer are selected so that a homogeneous solution is obtained when they are mixed and so that the desired morphology is obtained as described below. In one embodiment, the silicone-(meth)acrylate copolymer comprises from about 10/90 to about 75/25 (w/w) of one or more telechelic siloxanes to one or more (meth)acrylate monomers. In another embodiment, the silicone-(meth)acrylate copolymer comprises from about 25/75 to about 50/50 (w/w) of one or more telechelic siloxanes to one or more (meth)acrylate monomers.

The composition used to form the polymer network can also comprise a photoinitiator. Suitable photoinitiators include benzoin ethers, benzophenone and derivatives thereof, acetophenone derivatives, camphorquinone, and the like. Some examples of commercially available photoinitiators include DARACUR 1173, DAROCUR 4265, IRGACURE 651, IRGACURE 1800, IRGACURE 369, IRGACURE 1700, and IRGACURE 907, commercially from Ciba Geigy. The photoinitiator may be used at a concentration of from about 0.1 to about 5 wt. % of the total polymerizable composition, and, if curing is carried out under an inerting fluid, the fluid is preferably saturated with the photoinitiator or photoinitiators being utilized in order to avoid the leaching of initiator from the reaction. The rapid cure observed for these materials allows for the use of relatively low levels of photoinitiator, hence uniform cure of thick sections can be achieved due to deeper penetration of radiation.

Other components may be added to the photopolymerizable composition including liquid crystals, nanoparticles, and mixtures thereof.

The optical element may be formed by coating and curing the polymerizable composition as described below in the Examples. For example, the polymerizable composition can be coated onto a first substrate, tool, or mold. The coated polymerizable composition can then be covered with a second substrate, tool, or mold, which may be the same or different from the first. The resulting construction is then cured, preferably with UV radiation. Upon curing, the optical element may be separated from the first substrate, tool, or mold and optional second substrate, tool, or mold. Thus, a method of making the optical layer comprises: providing first and second monomers, polymerizing the first and second monomers, thereby forming a polymer network exhibiting a first phase and a second phase, the first phase and the second phase being chemically connected and having different refractive indices, the first phase being continuous, and the second phase comprising a plurality of structures dispersed within the first phase.

In one embodiment, a method of making the optical element comprises: coating a polymerizable composition on a substrate, the polymerizable composition comprising first and second monomers, and the substrate comprising a multilayer optical film, an antireflective layer, a hardcoat layer, a diffusive layer, a color filter layer, an adhesive layer, an antistatic layer, or a release layer; and polymerizing the first and second monomers, thereby forming a polymer network comprising a silicone (meth)acrylate copolymer and exhibiting a first phase and a second phase, the first phase and the second phase being chemically connected and having different refractive indices, the first phase being continuous, and the second phase comprising a plurality of structures dispersed within the first phase.

In another embodiment, a method of making the optical element comprises: coating a polymerizable composition on a polymer layer, the polymerizable composition comprising first and second monomers; polymerizing the first and second monomers, thereby forming a polymer network comprising a silicone (meth)acrylate copolymer and exhibiting a first phase and a second phase, the first phase and the second phase being chemically connected and having different refractive indices, the first phase being continuous, and the second phase comprising a plurality of structures dispersed within the first phase; and orienting the polymer layer and the polymer network. Orienting may comprise uniaxially or biaxially orienting the polymer layer and the polymer network.

In another embodiment, a method of making the optical element comprises: providing an oriented polymer layer comprising a polymer network, the polymer network comprising a silicone (meth)acrylate copolymer and exhibiting a first phase and a second phase, the first phase and the second phase being chemically connected and having different refractive indices, the first phase being continuous, and the second phase comprising a plurality of structures dispersed within the first phase; providing a substrate; and laminating the oriented polymer layer and the substrate together. Laminating the polymer layer and the substrate together may comprise adhering them using pressure, heat, an adhesive, or any other means known for adhering two layers together.

In another embodiment, a method of making the optical element comprises: providing an oriented polymer layer comprising a polymer network, the polymer network comprising a silicone (meth)acrylate copolymer and exhibiting a first phase and a second phase, the first phase and the second phase being chemically connected and having essentially the same refractive indices, the first phase being continuous, and the second phase comprising a plurality of structures dispersed within the first phase; providing a substrate; and laminating the oriented polymer layer and the substrate together. Laminating the polymer layer and the substrate together may comprise adhering them using pressure, heat, an adhesive, or any other means known for adhering two layers together.

In some cases, as described above, the polymer network may be unaxially or biaxially oriented. By controlling the temperature, rate of stretch, amount of stretch, and other parameters of the orientation process, different features can be imparted. For example, in some cases, orientation of the optical layer and thus the polymer network results in form birefringence which, in general, can be achieved in a system by an anisotropic spatial arrangement of its optically isotropic components. As a result of orientation, the optical layer comprising the polymer network may exhibit polarization effects and/or directional scattering in which light is scattered in a preferred direction. Directional scattering by the polymer network is thought to occur from gross alignment of morphological structure such that scattering becomes compounded in a particular direction. By controlling the orientation process, these optical properties can be fine tuned.

Figure 1B:
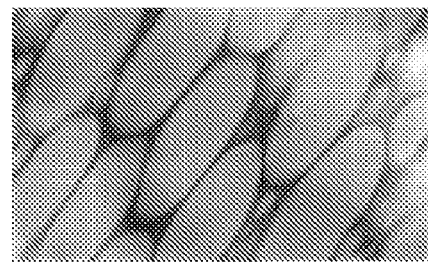
FIG. 1b shows a micrograph of the polymer network shown in FIG. 1a after stretching; the view is perpendicular to the axis of elongation.
Figure 1C:
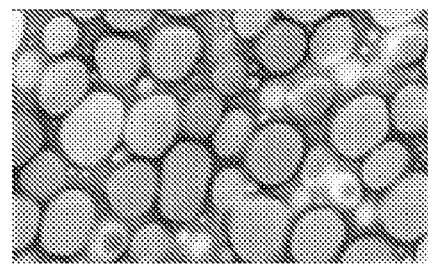
FIG. 1c shows a micrograph of the polymer network shown in FIG. 1a after stretching; the view is parallel to the axis of elongation.

A particular example of form birefringence is shown in FIGS. 1a-1c. These figures show micrographs obtained from transmission electron microscopy of film samples made as described below for Example 16. FIG. 1a shows a micrograph of the polymer network before orienting. FIG. 1b shows a micrograph of the polymer network of FIG. 1a after stretching to about 200% of its original length and at elevated temperature; the view is perpendicular to the axis of orientation. FIG. 1c shows a micrograph of the polymer network of FIG. 1b, except that the view is parallel to the axis of orientation. A sample of this film exhibited microcavitation upon orientation at room temperature. In some cases, oriented films diffused light as shown in Table 1.

The optical element can comprise one or more additional layers. One example of an additional layer is an isotropic optical layer which can include any type of layer designed to interact with light in a specified way; examples include an antireflective layer such as those disclosed in U.S. Pat. No. 6,926,952 (Weber et al.) and U.S. Pat. No. 6,144,479 (Lugg et al.), a diffusive layer, and a color filter layer such as one disclosed in WO 2002/076764 (Takeda). Another type of additional layer is a multilayer optical film as described, for example, in U.S. Pat. No. 5,808,798 (Weber et al.); U.S. Pat. No. 5,882,774 (Jonza et al.); and U.S. Pat. No. 6,590,707 (Weber et al.), and PCT Publication WO 99/36258 (Weber et al.). The additional layer may also be an oriented polymer layer such as a layer of oriented polyethylene terephthalate, polypropylene, polyethylene, or other similar material. The additional layer may also be a non-optical layer such as an adhesive layer, an antistatic layer, a hardcoat layer, or a release layer.

The optical element may have an outer surface comprising a plurality of features having lenticular or prismatic shapes, or a combination thereof. For example, the features may have hemispherical, ellipsoidal, conical, parabolic, or pyramidal shapes, or combinations thereof. In this case, the features may have random shapes and sizes. Hybrids of any combination of shapes may also be used, for example, pyramidal prismatic shapes, rectangular-based prismatic shapes, and prismatic shapes having rounded tips. Variable elongated shapes are also useful, as are irregular shapes. Variably sloped lenticular or random columnar shapes are especially useful. A combination of random shapes is also useful.

Furthermore, the optical element may have a very low index component (air cavities) in the stretched state. The cavities can possess regular or irregular shapes. These cavities provide enhanced internal light scattering such that the film appears white. This may enhancing the polarizing effect.

The dimensions of the features may also vary. In general, it is desirable for the features to be large enough such that little or no diffraction is observed, but small enough so that they cannot be seen by an unaided eye. In some embodiments, the features may have a dimension of from about 1 to about 100 um, for example, from about 5 to about 70 um. The plurality of features may comprise features having all the same size, or they may have any number of different sizes, for example, the sizes may be random.

The features may be disposed on the surface in any number of ways. For example, they may be randomly disposed, arranged in some type of regular pattern, or both. The distance between features may also vary, for example, the features may be disposed in close proximity to one another, in substantial contact or immediately adjacent to one another, or some combination. A useful distance between features is up to about 10 um. The features may be offset with respect to one another, angularly as well as transversely.

In general, the above variables regarding the shapes, sizes, and placements of the features are optimized to provide a desired amount of optical gain and, if required, the desired amount of diffusion. For example, a gain of at least about 1.05 is desired, and typically, a minimum amount of diffusion is necessary for hiding optical defects and/or light sources as described above. In some embodiments, the features have random shapes and sizes, and they may be randomly disposed on the surface. For example, the top structured surface may resemble a roughened or matte surface. In one embodiment, the features may have lenticular or prismatic shapes or a combination thereof, and the features may have random sizes and shapes. In another embodiment, the features may be hemispherical, ellipsoidal, conical, parabolic, or pyramidal shapes, or combinations thereof, and the features may have random sizes and shapes. Exemplary features and top structured surfaces are described in US 2006/0146562 A1; US 2006/0146566 A1; and US 2006/0103777 A1, all incorporated herein by reference. Useful top structured surfaces are also described in US 2006/0146562 A1; US 2006/0146566 A1; and US 2006/0103777 A1, but having a random distribution of both shapes and sizes.

The optical element disclosed herein may be used in a variety of optical devices in which polarizers and diffusers are used. For example, the optical device may comprise a prism, a display panel, a lens, a wire grid polarizer, a diffuser plate, a backlight assembly for a display device, or a light guide.

The invention may be more completely understood in consideration of the following examples.

EXAMPLES

Materials

Telechelic Siloxanes

Bis(3-aminopropyl)polydimethylsiloxanes (BAP-PDMS) were synthesized according to the procedure described by Hoffman, J. J.; Leir, C. M. *Polym. Int.* 1991, 24, 131. Number average molecular weights were determined by acid titration using HCl and bromophenol blue. Gas pressure chromatography indicated normal molecular weight distribution which polydipersities of about 2.0. Number average molecular weights of BAP-PDMS were 5K, 14K, 20K, 33K, 50K, and 90K.

ACMAS derivatives were prepared by first heating BAP-PDMS under vacuum (aspirator) to 100° C. to decompose any trace of carbamates, which could form from reaction of the amine groups with carbon dioxide. Then, 2 mol of vinyl dimethyl azlactone (from Groupe SNPE), were added slowly to 1 mol of BAP-PDMS at room temperature, with stirring.

MACMAS derivatives were prepared as described above for ACMAS derivatives, except that isopropenyl dimethyl azlactone (from Groupe SNPE) was used instead of vinyl dimethyl azlactone.

MAUS derivatives were prepared as described above for ACMAS derivatives, except that isocyanatoethyl methacrylate (from Showa Rodia) was used instead of vinyl dimethyl azlactone.

MeStUS derivatives were prepared as described above for ACMAS derivatives, except that m-isopropenyl-$\alpha,\alpha$-dimethylbenzyl isocyanate (from American Cyanamid) was used instead of vinyl dimethyl azlactone.

Preparation of Silicone (meth)acrylate Polymer Networks

Silicon-(meth)acrylate polymer networks were formed via free radical copolymerization of the telechelic siloxanes with (meth)acrylate monomers. Isobornyl acrylate (IBA) was used. For each film, a solution of the telechelic siloxane in isobornyl acrylate (IBA) was prepared. Photoinitiator (DAROCUR 1173) was added at 0.5 wt. %. The solution was then cast between two transparent films of polyethylene terephthalate. The solution was then polymerized by exposure to low intensity UV light for 5 to 15 minutes. The resulting films each had a thickness of about 100 um.

Examples 1-33

Examples 1-33 were prepared as described in Table 1. The films were uniaxially stretched by hand at room temperature and the results are shown in Table 1. In some cases, as described in Table 1, the films were evaluated by bending and heating during stretching. In particular, s-h-q refers to uniaxially stretching at a temperature of 120-125° C. followed by quenching the sample to room temperature. In some cases, polarizing effects were observed such that when the samples were viewed through a polarizer, the orientation of the polarizer made a difference to the viewed pattern.

FIGS. 2a-2c show an example of an optical film layer before and after uniaxial orientation. FIG. 2a shows a micrograph of a layer of 25/75 90K ACMAS/IBA (prepared as described in Example 16) obtained by transmission electron microscopy (TEM). The second phase can be seen as globules distributed throughout the first phase. A sample of this optical film layer was then uniaxially stretched to 200% of the original length, heated to about the Tg of a homopolymer of IBA, and quenched. Micrographs were taken of the oriented film; a perpendicular view is shown in FIG. 2b and a view parallel to orientation is shown in FIG. 2c. The oriented film became opalescent and exhibited directional diffusivity in that scattering of light exhibited a preferred direction.

TABLE 1

| Ex. | Silicone | Ratio with IBA (w/w) | Appearance Before Stretching | Characteristics Upon Stretching at Room Temperature |
|---|---|---|---|---|
| 1 | 5K ACMAS | 40/60 | Lightly bluish | Flexible plastic |
| 2 | 5K ACMAS | 50/50 | Lightly bluish | Flexible plastic |
| 3 | 5K ACMAS | 60/40 | Lightly bluish | Flexible plastic |
| 4 | 14K ACMAS | 50/50 | Lightly bluish | Elastomer with permanent set |
| 5 | 20K ACMAS | 25/75 | Hazy/white | Stretched whitens pseudo-reversibly |
| 6 | 20K ACMAS | 50/50 | Blue | Strong elastomer (>11 MPa tensile at break) |
| 7 | 33K ACMAS | 25/75 | Hazy/white | Stretched whitens pseudo-reversibly |
| 8 | 33K ACMAS | 35/65 | Hazy/white | Stretched whitens reversibly |
| 9 | 33K ACMAS | 40/60 | Hazy/bluish | Whitens reversibly at approx. 50% elongation |
| 10 | 33K ACMAS | 50/50 | Blue | Doesn't whiten; strong elastomer |
| 11 | 33K ACMAS | 60/40 | Lightly bluish | Soft, strong elastomer |
| 12 | 50K ACMAS | 25/75 | Hazy/white Trans.: 65.5% Clarity: 99% | polarizing effects when stretched at 1 × 5 and 1 × 4 |
| 13 | 50K ACMAS | 50/50 | Blue Transmittance: 81.4% Haze: 16.9, 6.6% Clarity: 98.6% | Elastomer - becomes plastic; shows directional scattering[1] >13 MPa at 300% elongation |
| 14 | 50K ACMAS | 40/60 | Hazy/white Transmittance: 65.2% Haze: 47.7, 40.0% Clarity: 98.6% | Whitens reversibly at approx. 50% elongation |
| 15 | 50K ACMAS | 60/40 | Light blue Transmittance: 92.5% Haze: 1.6% Clarity: 99% | not stretched |
| 16 | 90K ACMAS | 25/75 | Hazy/white | polarizing effects when stretched at 1 × 5 and 1 × 4 |
| 17 | 90K ACMAS[2] | 25/75 | Hazy/white soft (sticky) elastomer | Marginal polarization effect |
| 18 | 90K ACMAS | 40/60 | Hazy/white | Whitens reversibly at approx. 50% elongation |
| 19 | 20K MAUS | 25/75 | Clear; easily crazing plastic Crazing on sharp edges; first x than y directions Selective heating/healing | Directional scattering; frosted appearance Imaging |
| 20 | 20K MAUS | 50/50 | Clear; flexible soft plastic | Yields; becomes elastomeric; Directional scattering; |
| 21 | 50K MAUS | 25/75 | Blue plastic | Crazing - becomes white, elastomeric when stretched at room temperature; Directional scattering after s-h-q |
| 22 | 50K MAUS | 40/60 | Very lightly bluish; soft plastic | Crazing - becomes bluish white |
| 23 | 50K MAUS | 50/50 | Almost clear; soft plastic | Yields, becomes elastomeric |
| 24 | 50K MAUS | 60/40 | Almost clear; plastic | Yields; becomes white, elastomeric |
| 25 | 14K MeStUS | 50/50 | Clear | Flexible plastic; yields to become elastomeric |
| 26 | 20K MeStUS | 25/75 | Clear | Flexible plastic; crazes when bent |
| 27 | 20K MeStUS | 50/50 | Clear | Flexible plastic; easily breaks when stretched |
| 28 | 33K MeStUS | 40/60 | Clear | Crazes upon bending; Directional scattering after s-h-q |
| 29 | 33K MeStUS | 50/50 | Clear | Soft plastic; yields to become somewhat elastomeric when stretched at room temperature; Directional scattering after s-h-q |
| 30 | 33K MeStUS | 60/40 | Clear | Soft plastic; yields to become elastomeric |
| 31 | 50K MeStUS/IBA | 25/75 | Very lightly bluish; flexible plastic; difficult to remove from PET (crazes) | Crazes bluish/white |
| 32 | 50K MeStUS | 50/50 | Clear, soft plastic | yields to become elastomeric |

TABLE 1-continued

| Ex. | Silicone | Ratio with IBA (w/w) | Appearance Before Stretching | Characteristics Upon Stretching at Room Temperature |
|---|---|---|---|---|
| 33 | 50K MeStUS | 60/40 | Clear, soft plastic | Yields to become elastomeric; directional scattering |

[1] Film was heated while being stretched.
[2] Isooctyl acrylate was used instead of isobornylacrylate.

Example 34

A film of 50/50 50K MeStUS/IBA was made between two substrates, one having a microstructured surface of prisms having a 2 um pitch and the other being polyethylene terephthalate. A soft plastic film was obtained. After simultaneously heating and stretching, a non-uniform plastic film was obtained; this stretched film exhibited a diffraction pattern with much larger periodicity as compared to the film before heating and stretching.

What is claimed is:

1. A method of modifying light, comprising:
providing an optical element comprising an oriented polymer network, the oriented polymer network comprising a silicone (meth)acrylate copolymer and exhibiting a first phase and a second phase, the first phase and the second phase being chemically connected and having different refractive indices, the first phase being continuous, and the second phase comprising a plurality of structures dispersed within the first phase;
illuminating the optical element with light from a light source; and
detecting polarized or directionally diffused light transmitted by the optical element, wherein the silicon (meth) acrylate copolymer comprises a telechelic siloxane comprising bis(3-aminopropyl)polydimethylsiloxane or a compound represented by the formula:

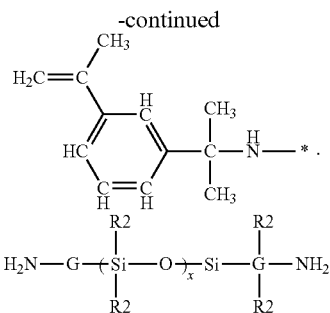

(i)

wherein
R is a divalent hydrocarbon group;
n is an integer from about 15 to about 1000; and
Y is selected from the group consisting of:

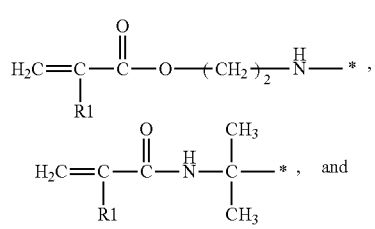

(ii)

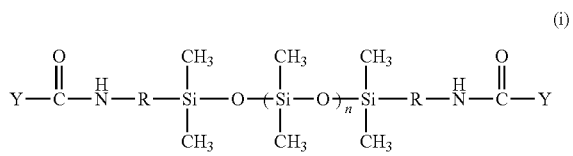

wherein
$R^2$ is independently an alkyl, haloalkyl, aralkyl, alkenyl, aryl, or aryl substituted with an alkyl, alkoxy, or halo;
G is independently an alkylene, aralkylene, or a combination thereof; and
x is equal to an integer of from about 15 to about 1000.

2. The method of claim 1, the silicone-(meth)acrylate copolymer comprising one or more (meth)acrylate monomers selected from the group consisting of iso-bornyl acrylate, iso-bornyl methacrylate, tert-butyl acrylate, iso-octyl acrylate, cyclohexyl acrylate, cyclohexyl methacrylate, trimethyl cyclohexyl acrylate, methyl methacrylate, methacrylic acid, benzyl methacrylate, ethyl methacrylate, 1-methylcyclohexyl methacrylate, 2-methylcyclohexyl methacrylate, 3-methylcyclohexyl methacrylate, 4-methylcyclohexyl methacrylate, 2-phenoxy ethyl methacrylate, 2-ethylhexyl acrylate, and hexanediol dimethacrylate.

3. The method of claim 1, the silicone-(meth)acrylate copolymer comprising telechelic siloxane and (meth)acrylate monomer, in ratio of from about 25/75 to about 50/50 (w/w), respectively.

4. The method of claim 1, wherein the oriented polymer network comprises liquid crystals, nanoparticles, or a mixture thereof.

5. The method of claim 1, wherein light from the light source is partially reflected by the optical element.

6. The method of claim 1, the optical element further comprising an additional layer adjacent the oriented polymer network, the additional layer comprising an isotropic optical layer, a multilayer optical film, an oriented polymer layer, or a non-optical layer adjacent the oriented polymer network.

7. The method of claim 1, wherein an outer surface of the optical element comprises a plurality of features having lenticular or prismatic shapes, or a combination thereof.

8. The method of claim 1, wherein the oriented polymer network comprises microcavities.

9. The method of claim 1, wherein the oriented polymer network is form birefringent.

10. The method of claim 1, wherein the oriented polymer network is uniaxially or biaxially oriented.

* * * * *